Nov. 4, 1952  H. L. KINDORF ET AL  2,616,645
PIPE HANGER
Filed Jan. 13, 1948
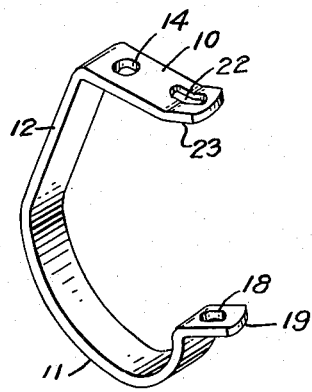
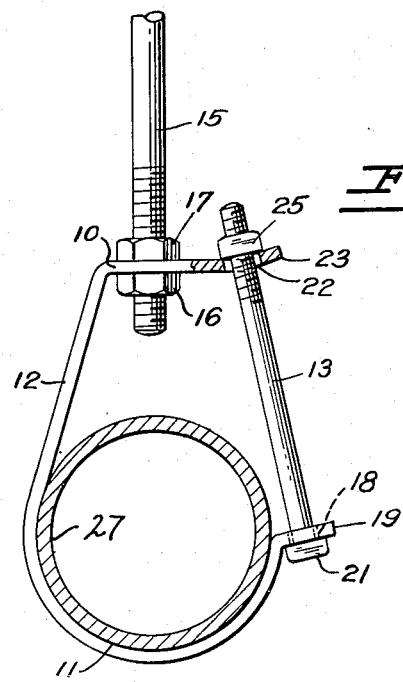
INVENTOR.
HARRY L. KINDORF
ORLAN C. KINDORF
BY
Charles M Fryer
ATTORNEY Patented Nov. 4, 1952

2,616,645

UNITED STATES PATENT OFFICE 2,616,645

PIPE HANGER

Harry L. Kindorf and Orlan C. Kindorf, San Francisco, Calif., assignors to The Kindorf Co., San Francisco, Calif., a corporation of California Application January 13, 1948, Serial No. 2,056

1 Claim. (Cl. 248—62)

This invention relates to pipe hangers of the kind employed for suspending pipe or conduit lines from an overhead position.

It is an object of the invention to provide a pipe hanger of extremely simple and inexpensive design capable of use to support a pipe temporarily before it is finally secured in place by the hanger. A further object is to provide a hanger that is adjustable throughout a relative wide range as to the elevation at which it supports the pipe. A further object of the invention is to provide a pipe hanger including securing means that will not be loosened or dislodged by vibration. Still further and more specific objects and advantages of the invention and the means by which it is carried into practice are made apparent in the following specification by reference to the accompanying drawings.

In the drawings:

Fig. 1 is a perspective view of a strap portion of a hanger embodying the present invention; and Fig. 2 is a view in front elevation of the entire hanger illustrating a pipe supported thereby in section.

The main portion of the hanger shown in the accompanying drawing comprises a bent metal strap shaped to form a top portion 10, a curved bottom portion 11 and a connecting member 12 extending between one side of the top portion and one side of the bottom portion. The opposite sides of these portions are connected by a removable bolt shown at 13. The bottom portion 11 is curved to the same radius as the outside diameter of the pipe that the hanger is designed to support so that the pipe is in effect cradled in the position shown in Fig. 2. The top portion 10 of the hanger is centrally perforated as shown at 14 in Fig. 1 for the reception of a hanger rod 15 which extends through it so that the top may be supported between a pair of nuts 16 and 17 adjustably positioned on the threaded end of the hanger rod. The upper end of the rod (not shown) is connected by any suitable means to conveniently positioned overhead structure from which the pipe line is suspended.

The bolt 13 extends through a perforation 18 in a lug 19 bent outwardly from portion 11. The size of the lug 19 and the position of the perforation 18 therein are such that the head 21 of the bolt, which is preferably square is prevented from rotating by abutment of one of its edges with the bottom portion adjacent the lug. The upper end of the bolt extends through a perforation 22 adjacent the end of the top portion 10 which perforation is somewhat elongated. Approximately centrally of the elongated perforation 22 a bend is formed to provide a slightly inclined end 23 on the top portion and thereby to form an angular seat for a nut 25 threaded on the upper end of the bolt. Because of this angular seat, parallel edges of the nut 25 tend to rest in a transverse position with respect to the top portion 10 and when the bolt 13 is under tension the nut cannot readily be displaced from this position by vibration or the like.

With the construction herein shown, the pipe hanger with the bolt 13 removed is of an open C-shape and the opening between the top portion 10 and the lug 19 on the bottom portion is greater than the diameter of the pipe for which the hanger is designed. Consequently, the hanger provides a temporary support for a pipe line before the bolt 13 is put in place. This affords a great convenience as all of the hangers may be arranged in a position to receive the pipe and then all of the pipe may be placed in the hangers where it will be temporarily supported while the threaded joints of the pipe are being made up and before it is necessary to insert the bolts 13. During this time, the bolts may be stored in a convenient position prior to assembly by inserting them through the perforation 18 in the lug 19 only and placing the nuts on them loosely so that each bolt may easily be removed by hand and will be conveniently accessible for final assembly into the position shown in Fig. 2. This construction eliminates the necessity of various types of temporary supports for holding a pipe in place while the permanent pipe hangers of conventional construction are being put up and assembled.

By reason of the fact that the supporting hanger rod 15 has a long thread on its end while the hanger is supported between the two nuts 16 and 17, a relatively wide range of vertical adjustment of the pipe is made possible and convenient and this adjustment may readily be made even after the entire pipe line is in place and all of the hangers are completely assembled.

A further advantage of the pipe hanger of the present invention resides in the fact that both the head 21 and the nut 25 of the bolt 13 are held against accidental rotation such as might be caused by vibration. The head 21 is positively held against rotation by its contact with the angular bend in the strap between lug 19 and the bottom portion 11. When tension is applied to the bolt 13 as by turning the nut 25 with the pipe 27 in place, the nut will tend to come to rest in the position illustrated and will resist accidental turning movement away from this position by virtue of the angularly related surfaces upon which it rests.

We claim:

A pipe hanger of the character described comprising a single resilient strap-like part shaped to provide a relatively flat top portion with a perforation for the reception of a supporting hanger rod, a side portion depending from one end of the top portion, a curved bottom portion to support a pipe, a perforated lug extending outwardly from an upwardly extending end of the bottom portion to form an angle therewith, a perforation adjacent the free end of the top portion, a bolt extending through said perforations to connect the top and bottom portions, a nut on said bolt, and means comprising a bend extending across the strap-like member through the perforation adjacent the free end thereof to prevent accidental loosening of the nut, the head of said bolt being held against rotation by engagement with the bottom portion at said angle.

HARRY L. KINDORF.
ORLAN C. KINDORF.

REFERENCES CITED

The following references are of record in the file of this patent:

UNITED STATES PATENTS

| Number | Name | Date |
|---|---|---|
| 508,914 | Cain | Nov. 21, 1893 |
| 867,760 | Schang | Oct. 8, 1907 |
| 981,769 | Kinowski | Jan. 17, 1911 |
| 1,805,006 | Neilon | May 12, 1931 |
| 1,978,033 | Suppes | Oct. 23, 1934 |
| 2,392,932 | Macbeth | Jan. 15, 1946 |